March 6, 1962 A. G. TALBERT 3,023,913
MOBILE CRANE UNIT WITH DEMOUNTABLE SIDE FRAME
Filed Oct. 28, 1957 5 Sheets-Sheet 1
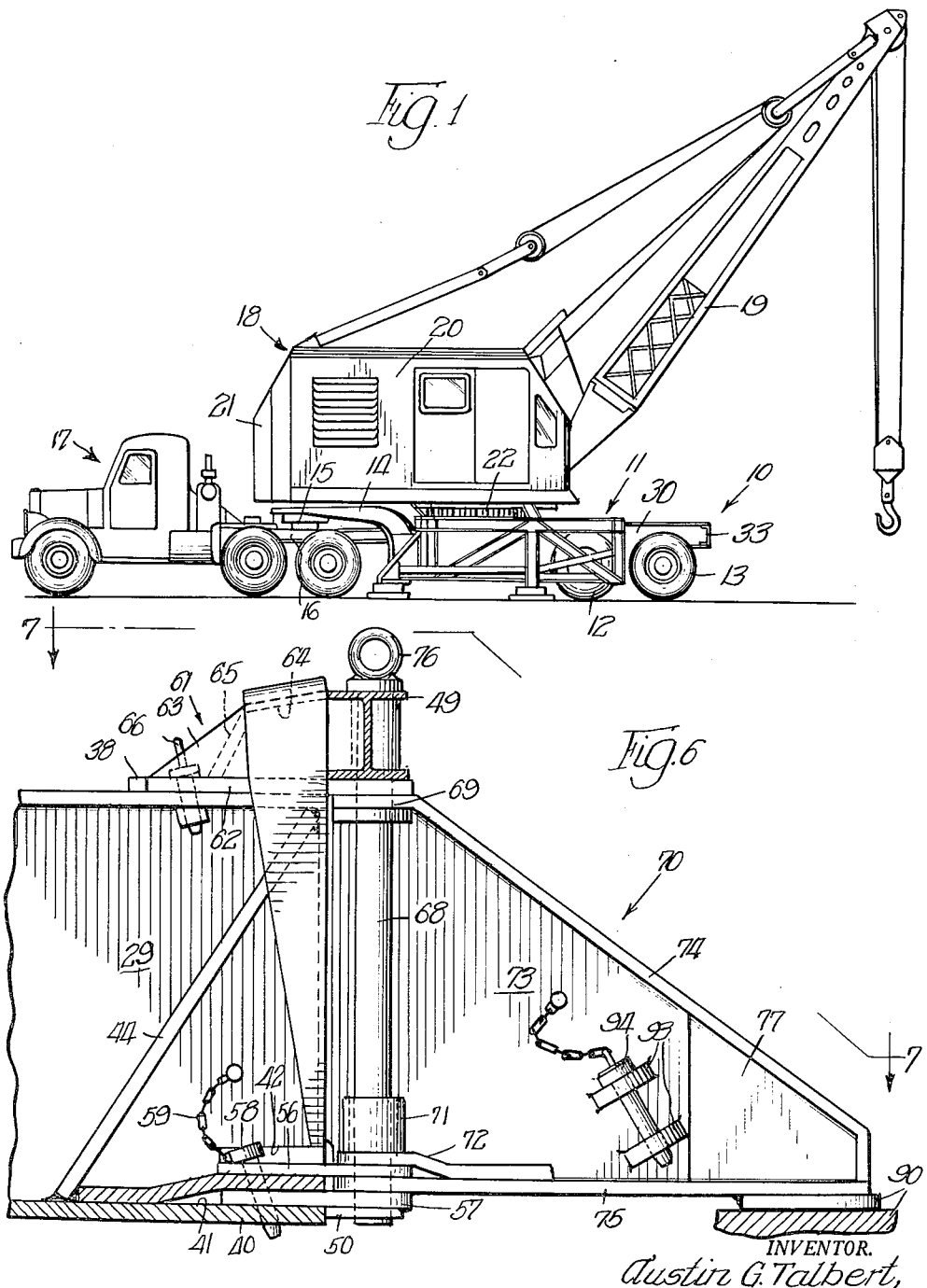
INVENTOR.
Austin G. Talbert,
BY
Cromwell, Greist & Warden
Attys.

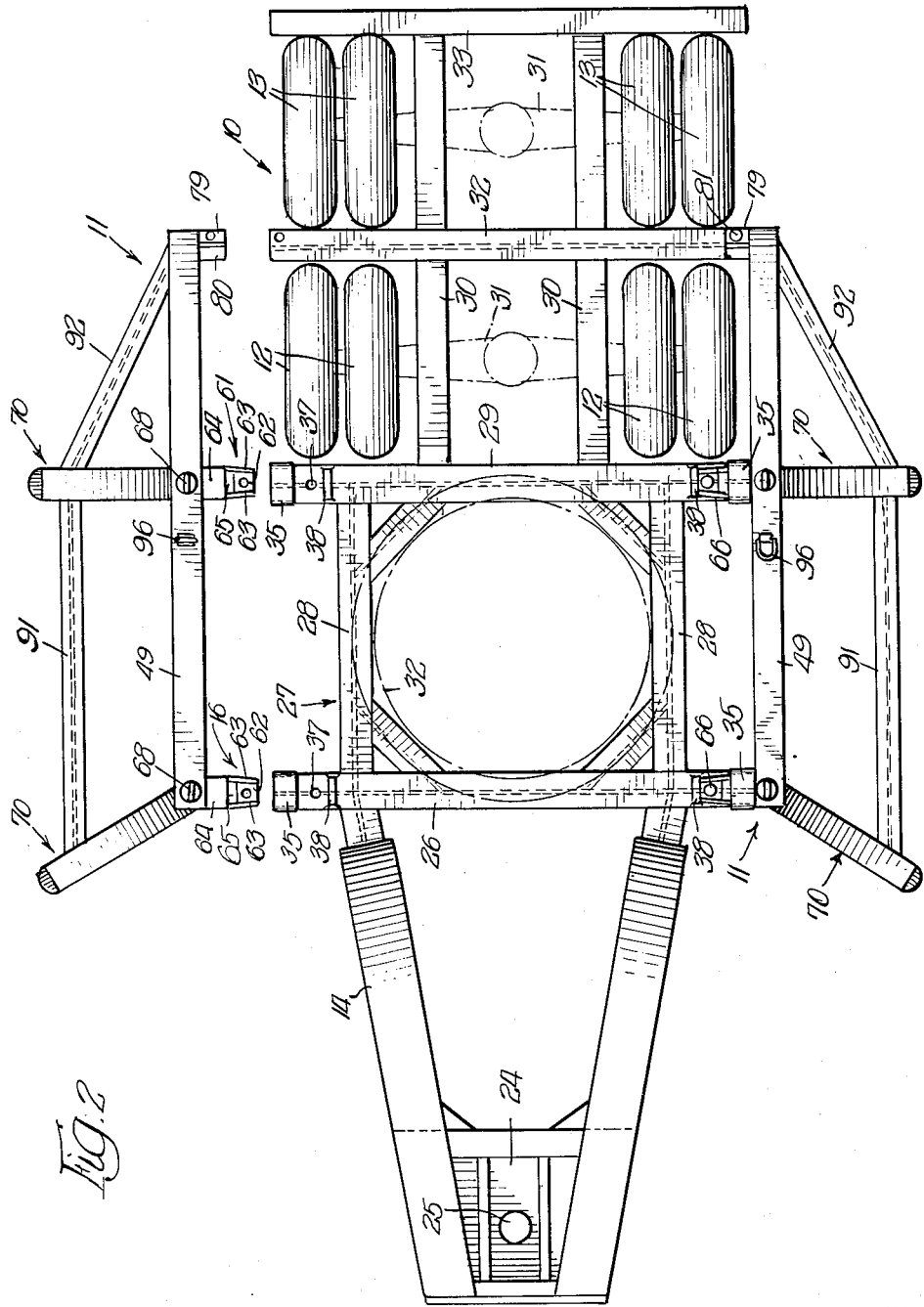

March 6, 1962  A. G. TALBERT  3,023,913
MOBILE CRANE UNIT WITH DEMOUNTABLE SIDE FRAME
Filed Oct. 28, 1957  5 Sheets-Sheet 3
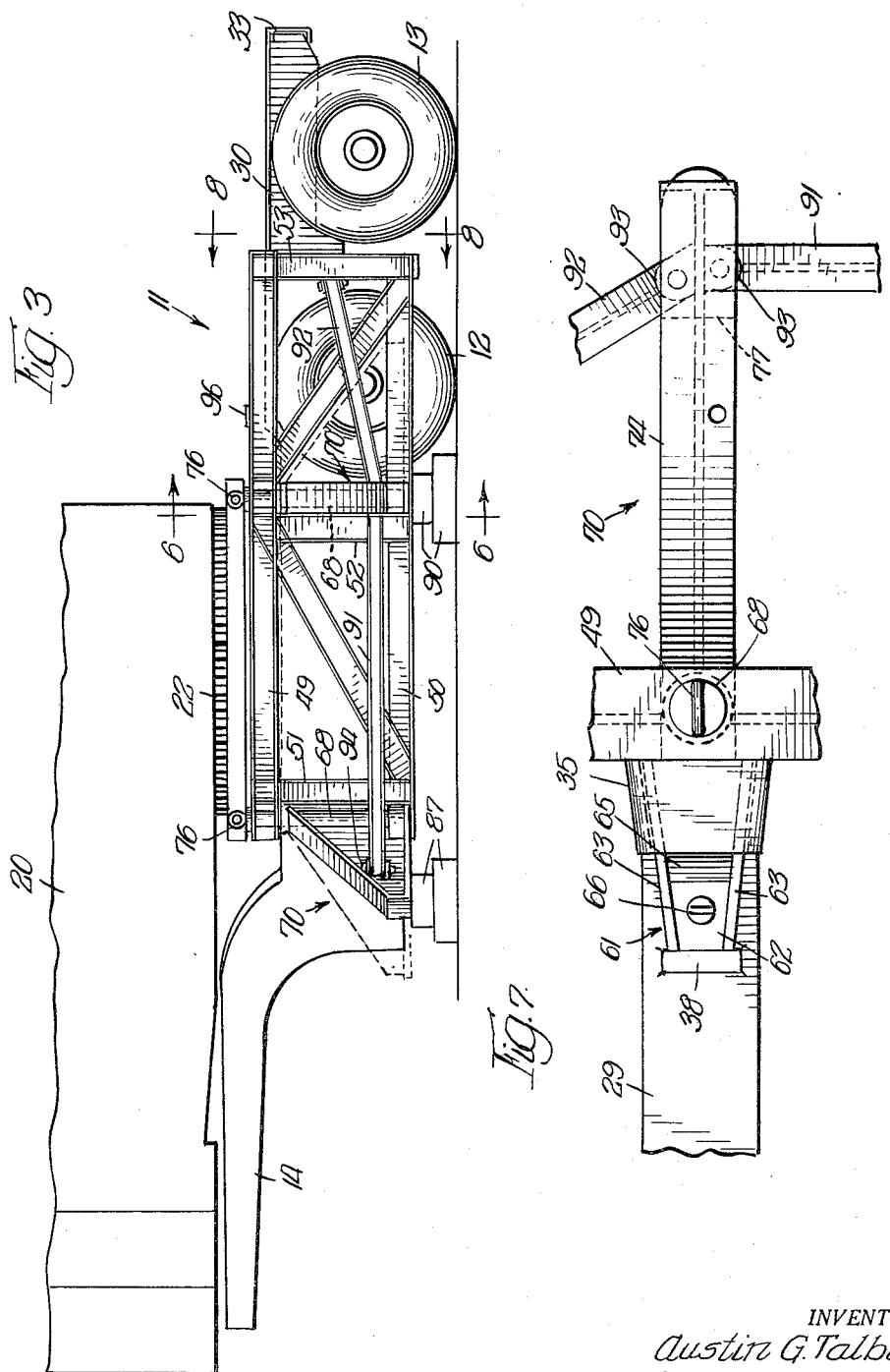
INVENTOR.
Austin G. Talbert,
BY
Cromwell, Greist & Warden
Attys March 6, 1962  A. G. TALBERT  3,023,913
MOBILE CRANE UNIT WITH DEMOUNTABLE SIDE FRAME
Filed Oct. 28, 1957  5 Sheets-Sheet 4
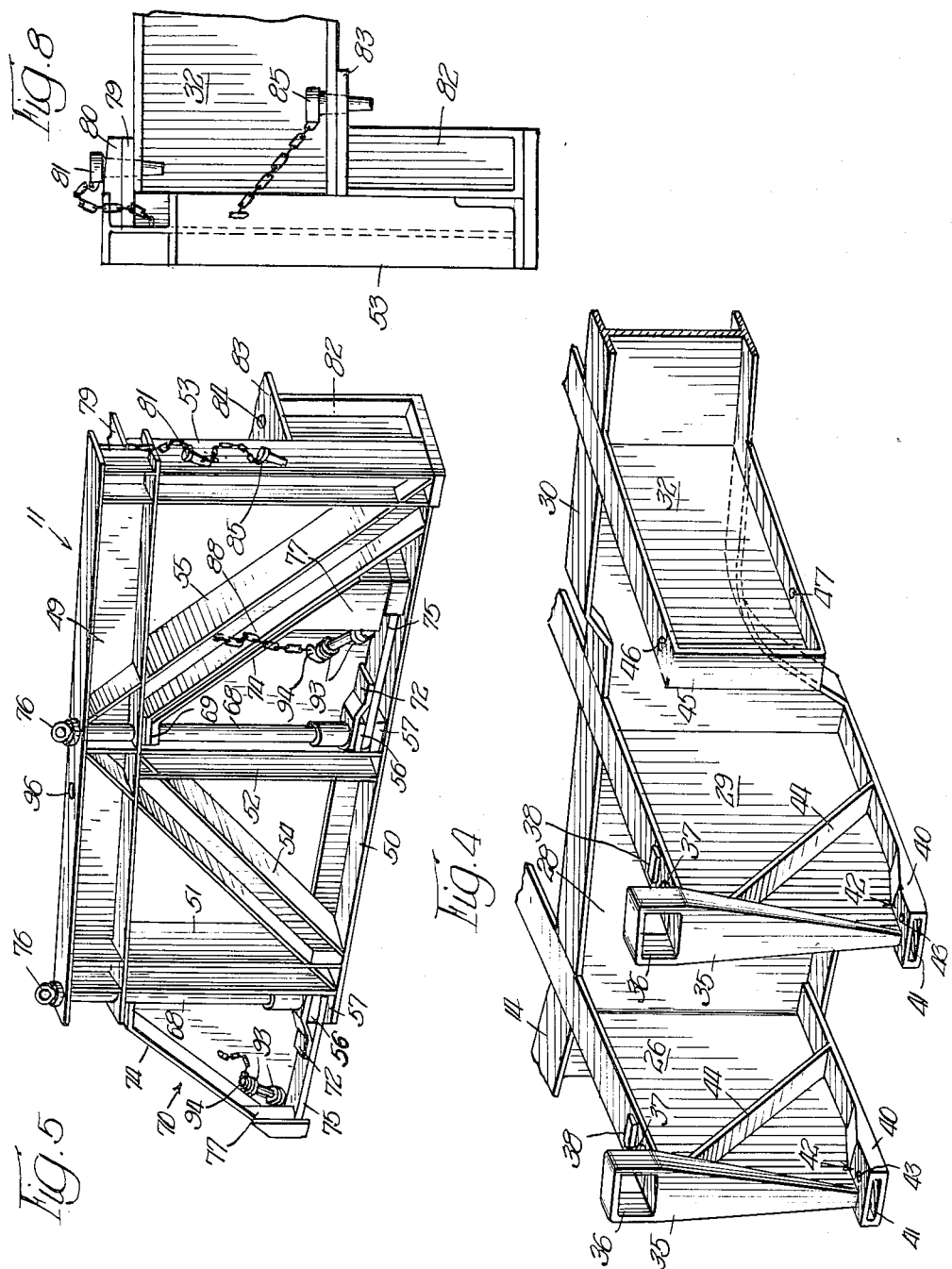
INVENTOR.
Austin G. Talbert,
BY
Cromwell, Greist & Warden
Attys.

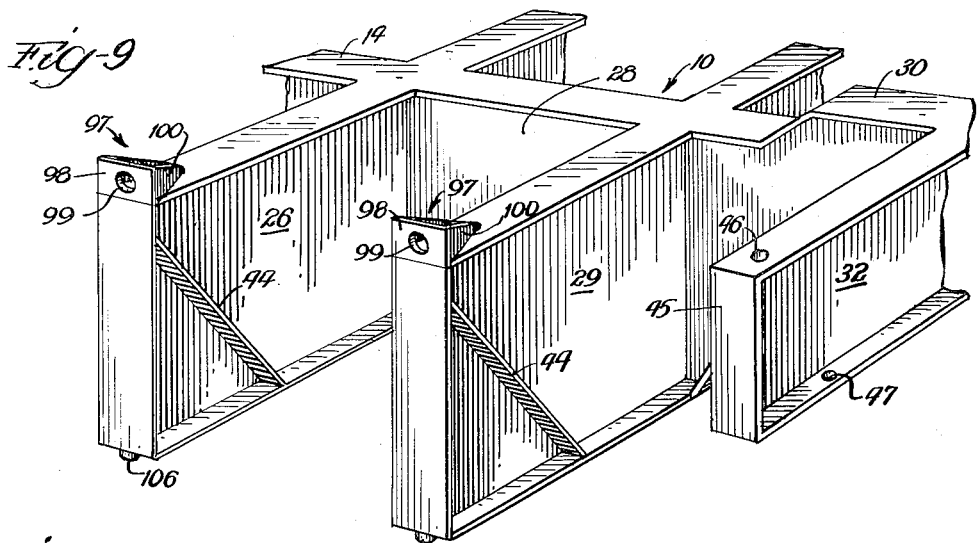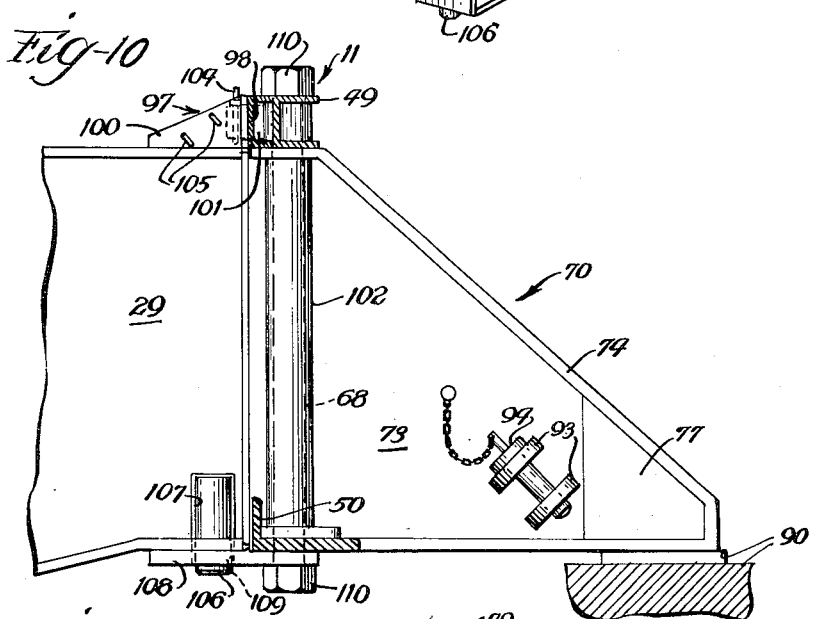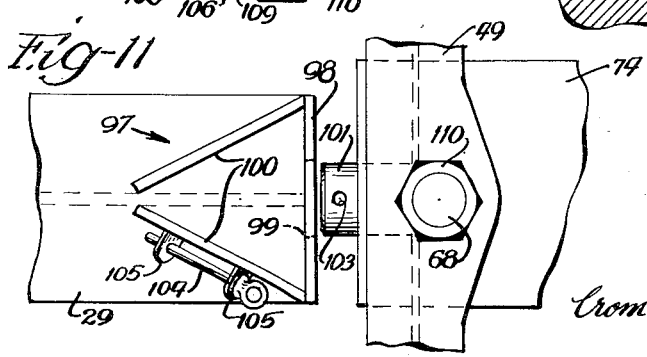

United States Patent Office 3,023,913
Patented Mar. 6, 1962

3,023,913
MOBILE CRANE UNIT WITH DEMOUNTABLE SIDE FRAME
Austin G. Talbert, Lyons, Ill., assignor to Talbert Construction Equipment Company, Lyons, Illinois, a corporation of Illinois
Filed Oct. 28, 1957, Ser. No. 692,748
12 Claims. (Cl. 212—145)

The present invention relates generally to a new and improved mobile crane unit formed from a mobile trailer on which is mounted a rotatable crane, the trailer having demountable side frame associated therewith to increase the over-all strength of the trailer for operational use of the crane. More specifically, the present invention is directed to an improved form of trailer on which is mounted a rotatable crane, the trailer being adapted for interconnection with a truck tractor for purposes of transporting the crane, the structural framework of the trailer being of lightweight design capable of providing adequate strength to support the dead weight of the crane during transportation of the same, the trailer being provided with demountable frame units capable of substantially increasing the structural strength of the trailer when mounted to the same in order to support the working weight of the crane.

Several different forms of cranes are used for construction purposes and among these forms is the self-propelled type which utilizes the crane operating power unit in driving the crane supporting chassis. In this type of arrangement it has been found unduly complicated and costly to provide a mobile chassis capable of being operated at normal speeds during movement of the crane over a substantial distance as, for example, across country. Consequently, the standard type of self-propelled crane is normally operated under its own power for only short distances, it being considered necessary and desirable to load the crane onto a faster form of conveyance when greater distances are travelled.

Other forms of mobile cranes utilize a self-supported trailer or a semi-trailer which is connected to a truck tractor without necessarily making use of the power unit of the crane in propelling the same. The truck tractor being capable of operation at higher speeds provides for undelayed movement of the crane over a substantial distance. Non-powered trailers capable of supporting the relatively heavy cranes are generally of adequate strength to support the dead weight of the crane during movement of the same as well as support the full working weight of the crane which, of course, is substantially increased over the dead weight of the same due to the weight of the load picked up and moved by the crane. In providing a trailer of such strength, the trailer itself is necessarily of substantially greater weight than the weight of a trailer designed merely to support the dead weight of the crane. Upon movement of the heavier trailer from one job site to another, the restrictive weight requirements of certain roads over which the mobile unit should preferably be moved, are exceeded. In certain instances, exceeding the legal road weights results only in the inconvenience of rerouting although, in many instances, the restrictions are such that extensive movement of the mobile unit is substantially curtailed. This results in reduced usefulness of the trailer supported crane.

It is an object of the present invention to provide an improved form of mobile crane unit utilizing a mobile trailer supporting a crane, the trailer being of adequate strength to support the dead weight of the crane during transportation of the same and being provided with demountable side frames which when attached to the trailer impart added strength to the same to permit the trailer to support the full working weight of the crane, the demountable feature of the side frames allowing the same to be removed from the trailer during transportation of the mobile crane unit to thus maintain the over-all weight of the same well within existing road weight requirements, the demountable side frames being adapted for separate transportation and for remounting on the trailer of the crane unit when the crane is placed in operation.

A further object is to provide a new and improved form of trailer assembly which is partially wheel supported and adapted for connection with a truck tractor for movement therewith, the trailer assembly having permanently mounted thereon a crane of substantial size and weight and further being provided with demountable side frames capable of providing the trailer assembly with the requisite strength requirements during full load handling operation of the crane, the side frames being readily mounted to certain frame members of the trailer and being so located to not only readily accommodate the full working weight of the crane but also support the trailer and mounted crane in its working position.

Still a further object is to provide a demountable frame unit adapted for attachment to a trailer which carries a rotatable crane thereon, the side frame unit being provided with outwardly pivotal reinforced plates or outriggers which may be readily positioned with respect to the trailer to impart the most efficient weight supporting function to the trailer in line with the particular location of the same, the outriggers being adapted for engagement with a supporting surface or surfaces to distribute a portion of the working load of the crane carried by the trailer thereto, the position adjusting feature of the outriggers being further capable of utilization during movement of the trailer with the side frames attached by pivoting of the outriggers into at least substantially coplanar relation with the side frames.

Another object is to provide a demountable side frame unit of the type described adapted for attachment to a trailer which carries a rotatable crane thereon, the side frame unit being provided with outwardly pivotal reinforced plates or outriggers which may be readily positioned with respect to the trailer to impart efficient weight supporting function to the trailer in line with the particular location of the same, the outriggers being adapted for engagement with a supporting surface or surfaces to distribute a portion of the working load of the crane carried by the trailer thereto, the side frame unit being demountably attached to the trailer by use of certain types of attaching arrangements each of an improved nature, each attaching arrangement including elements carried by the trailer frame and the side frame unit which cooperate with one another for quick and efficient mounting and dismounting of the side frame unit relative to the trailer frame.

Other objects not specifically set forth will become apparent from the following detailed description made in conjunction with the drawings wherein;

FIG. 1 is an elevation of the improved mobile crane unit of the present invention illustrating the use of the side frames thereof in their operative position just prior to detachment of the semi-trailer from a truck tractor;

FIG. 2 is a partly schematic top plan view of the semi-trailer forming a part of the mobile crane unit, this view illustrating the attachment of one side frame to the trailer and the positioning of the other side frame relative to the trailer just prior to its attachment;

FIG. 3 is an enlarged side elevation of the semi-trailer fragmentarily illustrating the mounting of the crane thereon;

FIG. 4 is a fragmentary perspective view of one side portion of the trailer;

FIG. 5 is a perspective of a side frame unit;

FIG. 6 is an enlarged fragmentary section taken generally along line 6—6 of FIG. 3;

FIG. 7 is a fragmentary top plan view taken generally along line 7—7 of FIG. 6;

FIG. 8 is an enlarged fragmentary elevation taken generally along line 8—8 of FIG. 3;

FIG. 9 is a fragmentary perspective of one side portion of the trailer similar to FIG. 4 and illustrating a modified form of side frame attaching arrangement;

FIG. 10 is an enlarged fragmentary section similar to that of FIG. 6 and illustrating the modified attaching arrangement used in mounting the side frame to the trailer body; and FIG. 11 is an enlarged fragmentary top plan view similar to FIG. 7 wherein a portion of a side frame is illustrated during attachment of the same relative to the cooperating portion of the trailer body.

In FIG. 1 the improved mobile crane unit of the present invention is illustrated as including a trailer 10 with a demountable side frame 11 attached thereto and set up in operative position. The trailer 10 is in the form of a semi-trailer having a wheel supported rear end utilizing twin axles, the locations of which are designated by the wheels 12 and 13. The front portion of the trailer 10 is provided with a gooseneck or trailer hitch 14 of known type which is adapted for connection to a fifth wheel 15 carried on the rear platform portion 16 of a truck tractor 17. Mounted on the trailer 10 is a known type of crane 18 provided with the conventional boom 19, motor housing and operator's cab 20, and counterweight 21 suitably attached to the boom 19 through associated rigging. The crane 18 is mounted in a known form on a bull gear 22 carried by the trailer 10, the crane 18 being rotatable relative to the trailer 10 through conventionel mechanical drive means which include hook-swing rollers and a power-driven swing pinion gear associated with the bull gear 22. The particular details of the operational aspects of the crane 18 are not illustrated as the crane may be supported by and operated on the trailer 10 in any desired manner, it being understood that upon detachment of the trailer 10 from the truck tractor 17, the full weight of the crane 18 is supported thereby. While a semi-trailer is illustrated and described, it will be understood that the invention is suitable for incorporation in any type of vehicle which is incapable of safely supporting a working load thereon.

As more particularly shown in FIGS. 2 and 3, the trailer 10 is provided with a frame body formed from a plurality of interconnected longitudinally and transversely extending frame members or beams. The forward portion of the trailer 10 is formed from the gooseneck 14 which is of known design carrying a king pin housing 24 at the nose thereof through which a king pin 25 extends. The divergent ends of the gooseneck structure 14 are attached to a transverse I-beam 26 which defines the front surface of a platform area 27 of generally rectangular shape which mounts the bull gear 22 and associated elements thereon. The platform area 27 is further defined by longitudinally directed I-beams 28 which are transversely spaced from one another and attached at their rearmost ends with a transversely extending I-beam 29. Rearwardly of the platform area 27 is an axle and wheel housing which defines a plurality of wheel receiving areas. The axle and wheel housing constitutes a pair of longitudinally extending I-beams 30 to which are suitably mounted spaced axles 31. The rear extension of the trailer 10 is sub-divided into separate wheel housing areas by a transverse I-beam 32 and the end of the trailer is defined by a further transverse beam 33. A plurality of wheels 12 constitute a forward wheel unit and a plurality of wheels 13 make up a rear wheel unit. The details of the forward and rear wheel units are not illustrated as any suitable arrangement may be used. In this connection it should be noted that, if desired, the power unit of the crane 18 may be drivingly connected to the axles 31 in order to provide a positive drive to the trailer 10 when the same is connected to the truck tractor 17 and the crane 18 is not in use. In this manner the power of the truck tractor 17 can be augmented particularly where steep grades or uneven terrain are encountered.

Demountable side frames 11 are designed for attachment to each side of the trailer 10 as shown in FIG. 2. Each of the side frame units 11 in its mounted relation is attached to the free ends of the transverse beams 26, 29 and 32. Opposite ends of these beams are each provided with identical side frame attaching elements and reference is now made to FIG. 4 wherein these attaching elements are shown in detail along one side of the trailer 10, it being understood that similar attaching elements are carried by the opposite side of the trailer 10.

Each of the beams 26, 28 and 29 defining the platform areas 27 are of substantial height or vertical dimensions. In conformance with conventional design of I-beams, each is also provided with a flat top and bottom surface of substantial width. The free ends of the beams 26 and 29 each have attached thereto a socket housing 35 which is tapered in a downwardly direction and is provided with a relatively large socket 36 at the top thereof. The opening defining the socket 36 extends completely through its housing 35 and the bottom surface of the same is flush with the top surface of its associated beam 26 or 29. Spaced inwardly from the socket 36 as more clearly shown in FIG. 2, is a drilled hole 37 which extends through the top flange of each of the beams 26 and 29. Spaced inwardly from each drilled hole 37 is a metallic block 38 suitably fixed to the top surface of each beam 26 and 29, such as by welding. The block 38 constitutes a stop element for a purpose to be described.

The bottom surface of each beam 26 and 29 at the free end thereof is provided with a bottom socket housing 40, the socket openings 41 of which are exposed outwardly of the ends of the beams 26 and 29. The vertical central web of each beam 26 and 29 is recessed immediately above the bottom socket housing 40 thereof to define an inwardly directed slot 42 immediately below the bottom of the top socket housing 35. The top wall of each bottom socket housing 40 is provided with a drilled hole 43 for a purpose to be described. As particularly noted in FIG. 4, the top socket housings 35 as well as the beams 26 and 29 are reinforced by diagonal plates 44, the number of such plates and location of the same varying with the over-all strength desired in the trailer 10. The beam 32 is provided with a vertical end plate 45 which provides a flat outer surface and the top flange of the beam 32 is provided with a drilled hole 46. The bottom flange of the beam 32 is similarly provided with a drilled hole 47, this latter hole being spaced further inwardly from the end of the beam 32 than the spacing of the hole 46.

The structural features of each side frame 11 are particularly shown in FIG. 5. Due to the identical construction of each side frame 11, it is necessary merely to describe one of the same. Each side frame is formed from a top longitudinally extending I-beam 49 and a bottom longitudinally extending L-beam 50. Three intermediate, vertically directed I-beams 51, 52 and 53 are interconnected at their ends with the beams 49 and 50 to define the main frame of each detachable side unit 11. Diagonal reinforcing beams 54 and 55 are located as shown in FIG. 5 to impart the requisite strength to the side frame construction. To the left of the vertical beam 51 and to the right of the vertical beam 52, as viewed in FIG. 5, pairs of vertically spaced tongues 56 and 57 are attached to the beam 50 and, as shown in FIG. 6, extend therethrough for attachment with the beam 26 and 29 of the trailer 10. The paired tongues 56 and 57 are fixedly attached to the beam 50 and extend through suitable openings in the vertical flange portion thereof. As each pair of tongues 56 and 57 are identical and are attached to their respective beams 26 and 29 in the same manner, only the attachment of the pair associated with the beam 29 is illustrated for purposes of simplification. The tongue 57 is received within the socket 41 of the socket housing 40 of the beam 29 and a pin 58 is passed through aligned drilled holes therein, one of which being the hole 43 illustrated in FIG. 4. The pin 58 is suitably attached to the vertical web portion of the beam 29 by a chain segment 59. In this manner the pin 58 is retained with the beam 29 when the side frame 11 is dismounted therefrom.

As particularly shown in FIGS. 6 and 7, a tongue element generally designated by the numeral 61 is fixedly attached to the longitudinal beam 49 for attachment to the top flange of the beam 29 following the receiving of the same through the socket 36 of the socket housing 35 mounted on the beam 29. The tongue element 61 is formed from a flat bottom plate 62 having attached thereto upstanding side walls 63. The bottom plate 62 tapers outwardly toward the end thereof and the side walls 63 converge toward the end of the bottom plate 62 particularly as shown in FIG. 7. An inclined top wall section 64 is received within the associated socket 36 in engagement with the inner top surface thereof which is complementarily inclined. The outer end of the top wall 64 is joined with a downwardly directed wall 65 which closes off a substantial portion of the tongue element 61 leaving the outermost marginal portion of the bottom plate 62 exposed. A drilled hole is provided in the exposed portion of the bottom plate 62 which is aligned with the hole 37 for the receiving of a pin 66 to fasten the tongue element 61 to the top flange of the beam 29. The outermost end of the bottom plate 62 is moved into abutment with the stop element 38 carried by the top surface of the I-beam 29, the stop element 38 functioning to limit inward movement of the tongue element 61 and to align the drilled holes through which the pin 66 is placed in locking position. The forward end portion of each side frame 11 is similarly provided with a tongue element 61 receivable within the socket 36 of the beam 26 and attached to the same in the manner described. Consequently, it will be noted that the attaching elements used to attach each side frame 11 to the beams 26 and 29 are identical and because of this similarity only the manner in which the side frame 11 is attached to the beam 29 has been specifically described.

The top and bottom beams 49 and 50, as particularly shown in FIG. 5, have two removable pins 68 of substantial length received through a plurality of vertically aligned openings. Each of the pins 68 is received through a top eye 69 of an outrigger or swingable plate generally designated by the numeral 70, and the bottom portion of each pin 68 is received through a collar 71 carried by a flange element 72 which, in turn, is attached to and carried by the plate 70. The plate 70 is triangular in outline being formed from a vertical central portion 73 having a top surface flange portion 74 sloping downwardly in an outwardly direction from the pin receiving eye element 69 forming a part thereof. The bottom surface of the plate 70 is defined by a horizontal flange portion 75 to which the collar supporting flange element 72 is suitably attached. The inner end of the bottom flange 75 is provided with a drilled opening aligned with the passageway of the collar 71 and this flange end along with the collar supporting flange element 72 defines a bifurcated attaching means receiving therebetween one end of the tongue 56 as particularly shown in FIGS. 5 and 6. The bottom flange 75 is received between the tongues 56 and 57 and the pin 68 is passed through aligned holes in these elements with the bottom of the pin journalled within the horizontal bottom flange of the beam 50. As shown in FIG. 5, each of the plates 70 is pivotally attached to the side frame 11 by their respective pins 68 in the manner described. The plates 70 are readily demountable from the frame 11 by withdrawal of the attaching pins 68, the top ends of the same being provided with integral eyes 76 for this purpose. The outermost ends of the plates 70 are reinforced by any desired number of welded plates 77 in order to prevent bending or buckling of the plate 70 when a load is applied thereto in the manner to be described.

The rearmost end portion of each side frame 11 is attached to the trailer 10 by the provision of an attaching flange 79 fixed to the rearmost end of the top beam 49 above the endmost vertical beam 53 and directed radially inwardly toward the trailer 10 in the same manner as the tongue elements 61. The attaching flange 79 is provided with an upstanding reinforcing rib 80 and is receivable against the top surface of the beam 32 in overlapping relation therewith. The attaching flange 79 is provided with a drilled hole which is aligned with the hole 46 in the top surface of the beam 32 and a pin 81 chain attached to the beam 49 is used to detachably fix the flange element 79 relative to the beam 32. The inner side surface of the vertical beam 53 has attached thereto a short beam 82 which supports on the top thereof an inwardly directed attaching plate 83. The plate 83 has a drilled hole 84 which is aligned with the drilled hole 47 of the beam 32 and a pin 85 chained to the vertical beam 53 is passed through the aligned holes 84 and 47 to complete the attachment of the side frame 11.

The swingable plates 70 are illustrated in FIG. 5 in their stored or inoperative positions relative to the side frame 11. The front plate 70, on the left as viewed in FIG. 5, is moved into coplanar relation with the side frame 11 projecting outwardly from the front portion thereof. The inoperative position of the front plate 70 is shown in broken lines in FIG. 3. In its operative position, the front plate 70 is moved radially outwardly of the side frame 11 to a position wherein it is diagonally related to the transverse beam 26 as shown in FIGS. 2 and 3. In this position, supporting blocks 87 are moved under the outermost end portion of the plate 70 into supporting engagement therewith, the blocks 87 being used to fill the space between the bottom surface of the front plate 70 and the ground or other permanent surface.

The rearmost plate 70 in its inoperative position as shown in FIG. 5 is in coplanar relation with the side frame 11 and received between the bottom surface of the diagonal reinforcing beam 55 and the top surface of the bottom beam 50. This plate 70 can be suitably held in this position by a pin 88 chained to the diagonal reinforcing beam 55 and received through aligned drilled holes in the flange portion of the beam 55 and top surface flange 74 of the plate 70. To place the rearmost plate 70 in its operative position, as particularly shown in FIGS. 2 and 3, the plate is pivoted about its pin 68 in a radially outwardly direction into coinciding relation with the longitudinal axis of the transverse beam 29. In this position suitable supporting blocks 90 are placed between the bottom flange 75 and the top of the ground to provide a load receiving supporting surface for the rearmost plate 70.

In order to fixedly position the plates 70 in their operative relation to one another and to the trailer 10, positioning braces 91 and 92 are attached thereto. The brace 91 is provided with an integral eye portion at each end receivable between spaced ears 93 carried by each of the swingable plates 70 as particularly shown in FIG. 5. Pins 94 are suitably chained to the plate 70 and are used to attach the ends of the brace 91 between the ears 93. The brace 92 is similarly attached at one end to the rearmost plate 70 and the remaining end thereof is suitably attached to the vertical beam 53 of the frame 11. By using both braces 91 and 92, the side plates or outriggers 70 are fixed relative to one another and to the side frame and trailer.

As previously described, when it is desired to transport the mobile crane unit from one construction site to another, the trailer 10 is connected to the truck tractor 17, the outriggers or load distributing plates 70 are swung into substantially coplanar relation with their associated side frames 11, and each complete side frame assembly is detached and removed from each side of the trailer 10. In order to swing the plates 70 into their inoperative positions, it is necessary merely to disconnect the bracing or stabilizing beams 91 and 92 and rotate the plates 70 about their respective pins 68. In disconnecting each side frame from the trailer 10, the pins 58 and 66 associated with each of the socket housings 40 and 35, respectively, are withdrawn to free the tongue elements carried by the top and bottom beams 49 and 50. The pins 81 and 85 are also withdrawn to disconnect the flange elements 79 and 83 from the frame member 32. Each side frame 11 is then free to be independently separated from the trailer 10 for separate transportation.

As each side frame is of substantial weight in order to provide the same with the strength necessary to distribute the operating weight of the crane 18, it is preferable to utilize either the crane 18 or another form of mechanical lifting device in order to completely detach each side frame 11 from the trailer 10 and load the same on a separate conveyance for transportation. The top surface of the longitudinally directed frame member 49 of each side frame 11 is provided with a pick-up ring 96 which is attached thereto at the balancing point of each side frame. Thus, the crane 18, for example, may be operated to support each side frame by connection with its pick-up ring 96 while the side frame is being moved radially outwardly away from the trailer 10 during disengaging of its tongue elements. Upon complete disengagement, each side frame 11 may then be readily lifted or moved by the crane 18 and subsequently deposited in a separate conveyance.

To mount the side frames 11 onto the sides of the trailer 10, the foregoing procedure is reversed and the crane 18 may be used to support each side frame 11 while the tongue elements of the same are aligned with their respective socket housings, inserted therein, and subsequently attached thereto by the various pins constituting the connecting elements. The attachment of the side frames 11 occurs while the forward end of the trailer 10 is still supported by the truck tractor 17. Upon completed attachment of the side frames 11, the outriggers 70 are swung outwardly into the position illustrated and the bracing beams 91 and 92 are connected there. A series of blocks are inserted between the bottom surface of each plate 70 and the ground surface to an extent that the trailer 10 is now in a self-supporting condition. At this point the truck tractor 17 may be disconnected from the trailer 10 and the latter is completely stabilized and maintained in a substantially horizontal plane. In this respect the front plates 70 are positioned in a forwardly directed manner in order to adequately support the front end of the trailer 10 following disconnection of the same from the truck tractor 17. It will be noted that the outriggers 70 not only substantially increase the load supporting strength of the trailer 10 but further convert the same into a self-supporting or self-sustained unit thereby freeing the truck tractor 17 for other uses while at the same time making it possible to utilize a semi-trailer as the basic crane supporting unit.

FIGS. 9–11 illustrate a modified form of side frame attaching arrangement whereby the side frame unit 11 may be readily mounted and dismounted relative to the trailer 10. Structural elements previously described which have not been modified by use of the different form of attaching arrangement are identified in FIGS. 9–11 by the same reference numerals. The transverse beams 26 and 29 of the trailer 10 carry on the top flat surfaces thereof at the outermost ends thereof pin receptacles generally designated by the numeral 97. Each receptacle, as particularly shown in FIG. 11, is of triangular outline being defined by a vertical front plate 98 which is centrally apertured as designated by the numeral 99. A pair of rearwardly convergent, vertically directed side walls 100 are attached at their outermost ends to the rear face of the front plate 98 and converge rearwardly thereof to define a substantially enclosed area into which an attaching pin 101 is received by insertion through the aperture 99.

As particularly shown in FIG. 10, each side frame attaching pin 101, being in the form of a stub shaft, is suitably attached to the top section of a pin shaft housing, the central section 102 of which forms a part of an outrigger 70 extending vertically intermediate the longitudinal top and bottom beams 49 and 50 defining the side frame unit 11. Each pin 101 is provided with a transverse drilled opening 103 which upon pin insertion into a receptacle 97 is located rearwardly of the front wall 98 and has a locking pin 104 received therethrough to fixedly lock the pin 101 against removal from the receptacle 97. Each locking pin 104 is suitably maintained in spaced ears 105 carried by a receptacle side wall 100 during non-use of the same as shown in FIG. 11.

Referring to FIGS. 9 and 10, the bottom surface of each transverse beam 26 and 29 of the trailer 10 has projecting downwardly therefrom a pin or stub shaft 106 which is suitably housed within a slot 107 in the bottommost end portion of each beam 26 and 29, and attached in the slot by any suitable means such as a weld. The pins 106 are located in close proximity to the opposite outer end surfaces of each transverse beam 26 and 29 of the trailer 10 and project downwardly from the flat bottom surfaces thereof to a substantial extent. The bottom surface of the longitudinal L-beam 50 of each side frame unit 11 has attached thereto an inwardly projecting tongue-like attaching flange 108 which is provided with an aperture 109 through which the downwardly projecting end portion of a pin 106 is received.

The pins 68 previously described for use in attaching each outrigger 70 to the side frame 11 is slightly modified as shown in FIG. 10 by being passed through the vertical tube or housing 102 and through suitably aligned openings in the top and bottom longitudinal frame members 49 and 50. Both ends of each pin 68 are threaded and held in place by nuts 110.

With the modified arrangement described, each side frame member 11 may be readily attached to its respective side of the trailer 10. A side frame is moved into association with the transverse beams 26 and 29 of the trailer 10 with the bottom attaching flanges 108 being aligned with the downwardly projecting attaching pins 106. Single motion upward movement of the frame member 11 results in insertion of the pins 106 through their respective apertures 109 and slight inward pushing of the frame members causes the uppermost attaching pins 101 to be received through aligned apertures 99 in the front plates 98 of each pin receptacle 97. Locking pins 104 are put into place and the entire side frame unit 11 is held in its operative position for efficient use in the manner previously described. It will be noted that with the side frame attaching arrangement described in connection with FIGS. 9–11, it is necessary merely to utilize locking pins 104 in connecting the top radially inwardly projecting pins 101 and it is unnecessary to make use of locking pins in suitably attaching the bottom portion of the side frame member to the trailer.

In connection with the overcoming of the problem of crane transportation within legal roadway weight requirements, the present invention effectively deals with this problem by the provision of demountable side frames which are of substantial mass and capable of very substantially increasing the over-all strength of the trailer 10. As an example of the variation in over-all weight which can be accomplished by use of the mobile crane unit of the present invention, the total weight of the entire mobile unit including the trailer 11, truck tractor 17 and crane 18 may be about 86,000 pounds. This total weight is without the side frames 11 included therein and is generally within standard highway weight restrictions. The trailer under these circumstances is of sufficient strength to support its share of the dead weight of the crane 18 preferably during substantially horizontal movement of the same. The two side frames 11 will have a combined weight of about 4,400 pounds and in order to provide the trailer 10 with the requisite strength to support the operating weight of the crane 18, this additional weight in the form of supporting structures such as the side frames is necessary. Consequently, if the trailer 10 were initially of sufficient strength to support the full operating weight of the crane, an additional 4,400 pounds must be moved by the truck tractor 17 and the over-all weight of the entire mobile unit is increased to this extent. An additional weight of this magnitude will generally exceed the standard road weight restrictions to an extent that extensive re-routing is necessary or, in some instances, substantial curtailment of movement results.

Thus it can be seen that with the provision of the demountable side frames 11, full efficient use of the mobile unit results with the added operation of mounting or demounting the side frames amounting to relatively little effort or expense. In certain instances it may not be necessary to completely remove each of the side frame assemblies in order to come within local restrictive road weights. In this event, in order to increase the over-all weight by about 1,000 pounds, it is necessary merely to remove the outriggers 70 which can readily be accomplished by withdrawal of the long pins 68.

The present application is a continuation-in-part of my co-pending application, Serial Number 636,112, filed January 24, 1957, now abandoned.

Obviously many modifications and variations of the invention as hereinbefore set forth may be made without departing from the spirit and scope thereof, and therefore only such limitations should be imposed as are indicated in the appended claims.

I claim:

1. A mobile crane unit including a crane rotatably supported by a mobile semi-trailer, said trailer being formed from interconnected frame members which define a central platform area on which said crane is rotatably mounted, a forwardly projecting trailer hitch for supported interconnection with a truck tractor, and rearwardly positioned wheel attaching areas, the frame members of said platform area including pairs of longitudinally and transversely directed beams of substantial vertical thickness, the top surfaces of said transverse beams at each of the ends thereof being flat and of appreciable width, each end of each of said transverse beams carrying a top socket housing the socket portion of which opens onto a flat top surface of the beam, a raised stop element carried by the top surface of each transverse beam inwardly of its top socket housing, a bottom socket housing carried by each end of each transverse beam near the bottom surface thereof, said wheel attaching areas being defined by interconnected longitudinally and transversely directed beams of less vertical thickness than the beams of said platform area, the transverse beam of said wheel attaching areas immediately adjacent said platform area having the free ends thereof aligned with the ends of the transverse beams of said platform area, said frame members being of adequate strength to support the dead weight load of said crane during movement of said unit while being of inadequate strength to support the full working load thereof, and demountable side frames attached to the ends of the frame members defining said platform area along each side of said trailer to increase the strength of said trailer to enable the same to support the full working load of said crane, said side frames being formed from longitudinally extending top and bottom frame members attached to one another in vertically spaced relation by a plurality of vertical frame members, the top frame member having spaced tongue elements received through the top socket housings carried by the transverse beams of said platform area and being detachably fixed to the top surfaces of said transverse beams in end abutment with said stop elements, the bottom frame member having spaced tongues which are detachably fixed within the bottom socket housings carried by the transverse beams of said platform area, the rearmost vertical frame member of each side frame being detachably fixed to the adjacent end of the transverse beam of said wheel attaching areas immediately adjacent said platform area, and radially outwardly positioned reinforced plates pivotally attached to each of said side frames by pins removably housed by said top and bottom frame members, the bottom surfaces of said plates being adapted for resting engagement with supporting surfaces to distribute a portion of the working load of said frame thereto.

2. A mobile crane unit including a crane rotatably supported by a mobile trailer, said trailer being formed from interconnected frame members which define a platform area on which said crane is rotatably mounted and at least one pair of trailer supporting wheel receiving areas, said frame members being of adequate strength to support the dead weight load of said crane during movement of said unit while being of inadequate strength to support the full working load thereof, and demountable side frames attached to the ends of the frame members defining said platform area along each side of said trailer to increase the strength of said trailer to enable the same to support the full working load of said crane, each of said side frames being formed from longitudinal extending top and bottom frame members attached to one another in vertically spaced relation by a plurality of vertical frame members, the top frame member having spaced radially projecting stub shaft pins received in pin housings carried by ends of frame members of said platform areas on the top surfaces thereof and being detachably fixed thereto by a locking pin received through a transverse aperture in each stub shaft pin, said pin housings each being defined by a vertically directed plate which is centrally apertured to receive a stub shaft pin therethrough, the bottom frame member having spaced tongues each of which project radially therefrom under the bottom surface of the end of a frame member of said platform area, each of said tongues being apertured and removably receiving therethrough a stub shaft pin carried by the frame members of said platform area along bottom surfaces thereof in downwardly projecting relation, and radially outwardly positioned reinforced plates pivotally attached to each of said side frames, the bottom surfaces of said plates being adapted for resting engagement with supporting surfaces to distribute a portion of the working load of said crane thereto, said plates being swingable about their attachment to the side frames into coplanar relation therewith.

3. A mobile crane unit including a crane rotatably supported by a mobile trailer, said trailer being formed from interconnected frame members which define a platform area on which said crane is rotatably mounted and at least one pair of trailer supporting wheel receiving areas, said frame members being of adequate strength to support the dead weight load of said crane during movement of said unit while being of inadequate strength to support the full working load thereof, and demountable side frames attached to the ends of the frame members defining said platform area along each side of said trailer to increase the strength of said trailer to enable the same to support the full working load of said crane, each of said side frames being formed from longitudinal extending top and bottom frame members attached to one another in vertically spaced relation by a plurality of vertical frame members, the top frame member having spaced radially projecting stub shaft pins received in pin housings carried by the ends of the frame members of said platform areas on the top surfaces thereof and being detachably fixed thereto by locking pins received through a transverse aperture in each stub shaft pin, said pin housings each being defined by a vertically directed plate which is centrally apertured to receive a stub shaft pin therethrough, the bottom frame member having spaced tongues each of which project radially therefrom under the bottom surface of the end of a frame member of said platform area, each of said tongues being apertured and removably receiving therethrough a stub shaft pin carried by the frame members of said platform area along bottom surfaces thereof in downwardly projecting relation radially outwardly positioned reinforced plates pivotally attached to each of said side frames, the bottom surfaces of said plates being adapted for resting engagement with supporting surfaces to distribute a portion of the working load of said crane thereto, said plates being swingable about their attachment to the side frames into coplanar relation therewith, and plate positioning means extending between the plates of each side frame and said trailer to hold said plates in their operative positions.

4. A wheel supported carrier comprising a body portion formed from interconnected frame members defining a platform area for receiving thereon a working unit of the type having a substantial working load and a substantially less non-working load, said frame members including cooperating longitudinally and transversely directed beams which at least near one end of said body portion define wheel mounting areas, longitudinally spaced transversely directed beams projecting outwardly from said platform area and wheel mounting areas along opposite sides of said body portion, and demountable side frames attached to the ends of said projecting transversely directed beams to impart added strength to said body portion to support the full working load of said working unit, each of said side frames extending longitudinally of said platform area and at least a substantial portion of a wheel mounting area, each side frame having a pair of outriggers pivotally mounted thereon with one of said outriggers being adjacent an end of said platform area, a first outrigger positioning beam detachably interconnecting the outer end portions of said outriggers, and a second outrigger positioning beam detachably interconnecting the outer end of the other of said outriggers to the end portion of said side frame extending longitudinally of a wheel mounting area to hold said outriggers in operative position.

5. The carrier of claim 4 wherein a first outrigger of each side frame adjacent the wheel mounting area over which the side frame extends is positioned by said beams at approximately right angles to the side frame, and a second outrigger adjacent the other end of said platform area is positioned by said beams to extend at an angle to said side frame which is greater than 90° and in a direction away from the first outrigger.

6. The carrier of claim 4 wherein each side frame is formed from longitudinally extending top and bottom frame members attached to one another by longitudinally spaced vertical frame members with a vertical frame member at each end of said side frame, and angled bracing frame members extending between said longitudinal and vertical frame members and defining therebetween at least one triangular opening in said side frame into which one of said outriggers may be pivoted for coplanar storage during non-use of said side frame.

7. A wheel supported carrier comprising a body portion formed from interconnected frame members defining a platform area for receiving thereon a working unit of the type having a substantial working load and a substantially less non-working load, said frame members including cooperating longitudinally and transversely directed beams which at least near one end of said body portion define wheel mounting areas, longitudinally spaced transversely directed beams projecting outwardly from said platform area and wheel mounting areas along opposite sides of said body portion, the ends of at least a pair of said projecting transversely directed beams each carrying a top socket housing the socket portion of which opens onto a flat top surface of the beam, a raised stop element carried by the top surface inwardly of each top socket housing, a bottom socket housing carried by each of said pair of projecting transversely directed beams near the bottom surface thereof, and demountable side frames attached to the ends of said projecting transversely directed beams to impart added strength to said body portion to support the full working load of said working unit, each of said side frames extending longitudinally of said platform area and at least a substantial portion of a wheel mounting area, each side frame along the top thereof carrying tongue elements received through said top socket housings and being detachably fixed to the top surfaces of said pair of projecting transversely directed beams in end abutment with said stop elements, each side frame along the bottom thereof having tongues detachably fixed within said bottom socket housings, each side frame having a pair of outriggers pivotally mounted thereon adjacent each end of said platform area, and outrigger positioning beams detachably connected to the outer end portions of said outriggers and the end portion of said side frame extending longitudinally of a wheel mounting area to hold said outriggers in operative position.

8. The carrier of claim 7 wherein a first outrigger of each side frame adjacent the wheel mounting area over which the side frame extends is positioned by said beams at approximately right angles to the side frame, and a second outrigger adjacent the other end of said platform area is positioned by said beams to extend at an angle to said side frame which is greater than 90° and in a direction away from the first outrigger.

9. The carrier of claim 7 wherein each side frame is formed from longitudinally extending top and bottom frame members attached to one another by longitudinally spaced vertical frame members with a vertical frame at each end of said side frame, and angled bracing frame members extending between said longitudinal and vertical frame members and defining therebetween triangular openings in said side frame into which said outriggers may be pivoted for coplanar storage during non-use of said side frame.

10. A wheel supported carrier comprising a body portion formed from interconnected frame members defining a platform area for receiving thereon a working unit of the type having a substantial working load and a substantially less non-working load, said frame members including cooperating longitudinally and transversely directed beams which at least near one end of said body portion define wheel mounting areas, longitudinally spaced transversely directed beams projecting outwardly from said platform area and wheel mounting areas along opposite sides of said body portion, and demountable side frames detached to the ends of said projecting transversely directed beams to impart added strength to said body portion to support the full working load of said working unit, each of said side frames extending longitudinally of said platform area and at least a substantial portion of a wheel mounting area, each side frame along the top thereof carrying radially inwardly projecting stub shaft pins received through pin housings carried by the ends of at least a pair of said projecting transversely directed beams, locking pin means received through said stub shaft pins and said beams to detachably lock said side frame to said body portion, each side frame along the bottom thereof carrying radially inwardly projecting tongues which are apertured and which removably receive therethrough stub shaft pins carried by said pair of beams along bottom surfaces thereof and projecting downwardly therefrom, each side frame having a pair of outriggers pivotally mounted thereon adjacent each end of said platform area, and outrigger positioning beams detachably connected to the outer end portions of said outriggers and to the end portion of said side frame extending longitudinally of a wheel mounting area to hold said outriggers in operative position.

11. The carrier of claim 10 wherein a first outrigger of each side frame adjacent the wheel mounting area over which the side frame extends is positioned by said beams at approximately right angles to the side frame, and a second outrigger adjacent the other end of said platform area is positioned by said beams to extend at an angle to said side frame which is greater than 90° and in a direction away from the first outrigger.

12. The carrier of claim 10 wherein each side frame is formed from longitudinally extending top and bottom frame members attached to one another by longitudinally spaced vertical frame members with a vertical frame member at each end of said side frame, and angled bracing frame members extending between said longitudinal and vertical frame members and defining therebetween triangular openings in said side frame into which said outriggers may be pivoted for coplanar storage during non-use of said side frame.

References Cited in the file of this patent
UNITED STATES PATENTS

| | | |
|---|---|---|
| 845,770 | Ferris | Mar. 5, 1907 |
| 1,512,472 | Leipert | Oct. 21, 1924 |
| 2,074,158 | Avery | Mar. 16, 1937 |
| 2,346,900 | Black | Apr. 18, 1944 |
| 2,653,829 | Sheehan | Sept. 29, 1953 |